July 19, 1960 — C. W. WATSON — 2,945,904
RECOVERY OF OLEFINS
Filed Dec. 30, 1957
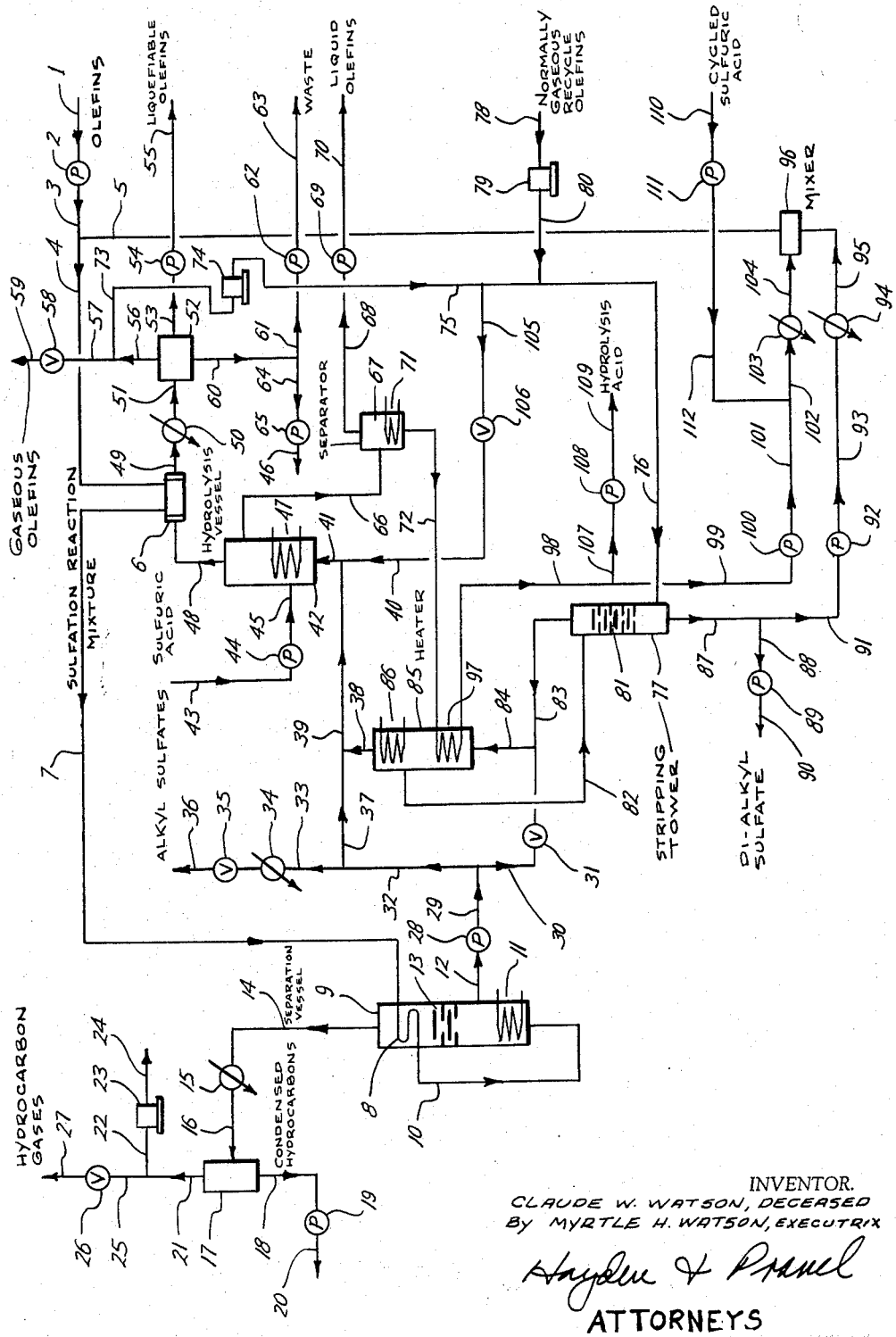
INVENTOR.
CLAUDE W. WATSON, DECEASED
By MYRTLE H. WATSON, EXECUTRIX
ATTORNEYS

United States Patent Office 2,945,904
Patented July 19, 1960

2,945,904

RECOVERY OF OLEFINS

Claude W. Watson, deceased, late of Port Arthur, Tex., by Myrtle H. Watson, executrix, 5000 Lakeshore, Port Arthur, Tex.

Filed Dec. 30, 1957, Ser. No. 706,003

14 Claims. (Cl. 260—677)

This invention relates to the recovery in high purity of olefin hydrocarbons even from their dilute concentrations in other olefins, in other hydrocarbons and in other substances. The process of this invention is based on the differences in chemical equilibria which prevail in the reactions of different olefins in their reactions with concentrated sulfuric acid in the formation of alkyl sulfates and the accompanying ionic reaction intermediates the existence of some of which is transitory and of such short duration that their role in the chemical mechanisms has been unrecognized previously. The delineation of these chemical mechanisms has made possible the selective recovery of branched chain and straight chain olefins as well as the individual olefins within a given type. In addition to the recovery of olefins in high purity, the process of this invention makes possible the selective reaction of olefins in the production of alkyl sulfates useful in established processes such as in the manufacture of alcohols and in the alkylation of isoparaffins in the production of the highly branched hydrocarbons which constitute superior gasolines. Among the advantages of the process of this invention in the selective reaction of olefins in the formation of alkyl sulfates is the utilization of dilute sulfuric acid such as for example, that which is a product of the manufacture of alcohols and the concentrated sulfuric acid which constitutes the spent acid from the sulfuric acid alkylation process.

A process has been available heretofore for the recovery of isobutylene in high purity from its relatively high concentrations in other normally gaseous olefins and in normally gaseous paraffin hydrocarbons. The process of this invention is not limited to the recovery of isobutylene since it is applicable to the recovery in high purity of all the normally gaseous olefins except ethylene and to the recovery of all of the normally liquid olefins as well. Among the additional advantages of the process of this invention is the fact that in all of its applications, the minimum temperatures are such that they are readily attainable with the cooling water universally available, thus making unnecessary recourse to refrigeration which is required in the process for the recovery of isobutylene in the processes known heretofore.

With the single exception of the process referred to in the foregoing for the recovery of isobutylene in high purity by its chemical reaction with sulfuric acid, recourse has been had heretofore to fractional distillation for the recovery of other individual olefins in high purity from their mixtures in other hydrocarbons. The difference in the volatility of the individual olefins and other hydrocarbons with which the olefins are associated is so small as to make impossible the recovery of individual olefins except in the case of ethylene and propylene which have volatilities sufficiently different from each other to make feasible their separation into an ethane-ethylene fraction and a propane-propylene fraction from which in turn the ethylene can be separated by fractional distillation from ethane and the propylene from propane. These fractional distillations involve the excessive costs involved in the provision of the high pressures and the refrigeration required for the liquefaction of these fractions. Even in these applications of fractional distillation, the volatilities of the various hydrocarbons differ so little that high costs are involved in the provision of the refrigeration necessary for the liquefaction of the reflux required for the rectification inherent in the fractional distillation. Beginning with the butylenes, isomeric hydrocarbons are met with, the volatilities of which are so nearly the same as to make prohibitive the costs of obtaining the individual olefins by fractional distillation alone.

That sulfuric acid is selective in its reaction with various olefins has been, of course, long known. In the very earliest attempts to analyze hydrocarbons in the determination of individual olefins, aqueous sulfuric acid of different concentrations was used as a chemical reagent. These attempted analytical methods failed due to a lack of understanding of the mechanism of the chemical reactions involved. In the complete delineation of the multitudinous reactions of aqueous sulfuric acid with hydrocarbons it has been recognized that the indispensability of an adequate understanding of the primary reaction of sulfuric acid to which its unique characteristics are due, which primary reaction is in accordance with the equation (1) 

The reaction of Equation 1 is the self-ionization of sulfuric acid which by others has been referred to as an "autoprotolysis" reaction in the mistaken belief that the ionization results from the loss of a proton from one molecule of sulfuric acid followed by the separate existence of the proton during its transfer and prior to its acceptance by another molecule of sulfuric acid. The proton being the nucleus of the hydrogen atom requires for its release from a molecule of sulfuric acid an energy input to the molecule at least equal to its heat of formation plus the additional energy input required for the separation of a hydrogen atom into its electron and its proton. In contrast to the impossibly great energy input required for the separation and transfer of a proton is the insensibly small energy input associated with the reaction of Equation 1 evidenced by the substantial increase in electrical conductance of aqueous sulfuric acid obtainable with an energy input barely detectable by its increase in temperature. In the delineation of the reaction of aqueous sulfuric acid with hydrocarbons, it has been found that the self-ionization of sulfuric acid as shown in Equation 1 is the result of the transfer of an electron from one molecule of sulfuric acid to another accompanied by the switching of a hydrogen atom in the opposite direction between the two molecules of sulfuric acid involved in the ionization reaction. This fundamentally new concept of the inner mechanism of the reaction of Equation 1 has its origin in the extension of the exclusion principle which heretofore without any theoretical basis has been used in the attempted delineation of the extra nuclear structure of the chemical elements which by others is held to consist exclusively of electrons. By recourse to the newer particles of matter now fully established, it has been possible to extend and modify the exclusion principle with the avoidance of the untenable participation of protons as such in chemical reactions as has been assumed by those who have invoked "autoprotolysis" in accounting for the reaction of Equation 1.

In accordance with a widely adopted nomenclature and for reasons which will become apparent hereinafter, the resultant negative ion of Equation 1 is referred to as the "lyate" ion and its positive ion as the "lyonium" ion. In aqueous sulfuric acid there is substantial reaction of the lyonium ion in accordance with the equation (2) $\quad H_2O + H_3SO_4^+ = H_2SO_4 + OH_3^+$ By the addition of Equations 1 and 2 there is obtained the equation (3) $\quad H_2SO_4 + H_2O = HSO_4^- + OH_3^+$ The resultant negative ion of Equation 3 will be referred to hereinafter as the "bisulfate" ion in accordance with the commonly accepted terminology and in order to distinguish it from the lyate ion of Equation 1. Except for their origins these two negative ions are identical. By others, the reaction of Equation 3 is held to be due exclusively to the direct ionization which results from the reaction of water with sulfuric acid in accordance with the "proton theory" of acids and without the intervention of the self-ionization of sulfuric acid in the reaction of Equation 2. The "proton theory" like the supposed "autoprotolysis" referred to in the foregoing is based on the invalid assumption that the ionization is a result of the transfer of protons from an acid molecule to a water molecule. The "proton theory" accounts for the fact that the positive ion $OH_3^+$ of Equations 2 and 3 is widely referred to as the "hydrogen ion" on the assumtion that it is the nucleus of the hydrogen atom i.e. the proton which is liberated by the acid molecule and becomes attached to the water molecule. This basis for the ionization of the reaction of Equation 3 is wholly erroneous as can be demonstrated by the reasoning I have adduced in the foregoing to account for the fallacy of the "autoprotolysis" mechanism. Recognition of the impossible separate existence of the proton in aqueous solution accounts for frequent reference by others to the positive ion of Equations 2 and 3 as the "hydronium" ion by some and as the "oxonium" ion by others. In order to focus attention on the indispensable joint participation of both the hydrogen and oxygen atoms in the formation of $OH_3^+$, it will be referred to hereinafter as the "hydroxonium" ion.

To the extent to which the hydroxonium ion is a product of the self-ionization of sulfuric acid in accordance with Equation 2, it reacts with olefins in accordance with the equation (4) $\quad C_nH_{2n} + OH_3^+ = C_nH_{2n+1}OH_2^+$ In Equation 4, the formula $C_nH_{2n}$ applies to reactant olefins having any number of carbon atoms $n$. In the reaction of Equation 4 any one of the hydrogen atoms of the hydroxionium ion becomes bonded to one of the two carbon atoms involved in the double bond of the olefin while the other carbon atom is bonded directly to the oxygen atom. The reaction of Equation 4 is invariably in accordance with Markownikoff's rule in the process of this invention in that in the formation of the alkyl hydroxonium ion the carbon atom which becomes bonded to the oxygen atom is the carbon atom in the olefin molecule which is bonded to the least number of hydrogen atoms. Markownikoff's rule like many other empirical rules of chemistry can be interpreted in terms of the extension of the exclusion principle which encompasses a new grasp of chemical reactions in that it utilizes and coordinates the newly found particles of matter in the complete delineation of chemical reactions known only empirically heretofore and makes manifest the existence of hitherto unrecognized chemical reactions chiefly through the establishment of the sole ionic reaction intermediates having a transitory existence of such short duration as to be unobservable. Fortunately, the vast wealth of empirical data pertinent to the reactions of sulfuric acid with hydrocarbons which have been accumulated through the years and being now readily available can be utilized in the delineation of all the reactions of the process of this invention, thus making unnecessary recourse to the details of the extra nuclear structures of the atoms of the chemical elements which form the basis of the extension of the exclusion principle. Actually the only justification for mentioning the extension of the exclusion principle is to emphasize the fact that in the development and establishment of the process of this invention, there has been recourse to information unrecognized by others. The delineation furnishes an adequate explanation of the fact that while the reaction of Equation 4 is applicable to the reaction of sulfuric acid with all olefins, very great differences are observed in the reaction of individual olefins with sulfuric acid as is well known. For example, ethylene reacts only with highly concentrated acid and is not polymerized by aqueous sulfuric acid of any concentration. In contrast, isobutylene reacts with highly dilute sulfuric acid and is polymerized in its reaction with aqueous sulfuric acid in which the mol ratio of sulfuric acid to water is not substantially less than three. While propylene is readily polymerized in its reactions with concentrated sulfuric acid, there is no reaction at all when the sulfuric acid is diluted to the point at which the reactions of isobutylene with sulfuric acid can be initiated. In their reactions with sulfuric acid, the straight chain butylenes resemble more closely propylene than isobutylene. In the application of the reaction of Equation 2 in the delineation of the chemical mechanism of the pertinent observed and predicted phenomena, cognizance was taken as a first step of the fact that in the reaction of ethylene in accordance with Equation 2 both secondary and primary hydrogen bonds are involved in the formation of the ethyl hydroxonium ion while the trimethyl methyl (tertiary butyl) hydroxonium ion containing only primary hydrogen atoms is the result of the reaction of isobutylene in accordance with Equation 2. The 1-methyl ethyl (isopropyl) hydroxonium ion is formed in the reaction of propylene in accordance with the reaction of Equation 4 and therefore contains primary, secondary and tertiary hydrogen atoms. Paralleling propylene, the straight chain butylenes react with the hydroxonium ion in the formation of the 1-methyl propyl hydroxonium ion and therefore resembles closely the propyl hydroxonium ion. The principles that have been used in the delineation of the configuration of the carbon and hydrogen atoms in the alkyl hydroxonium ions referred to in the foregoing have been used in the determination of the structures of the other olefins of higher molecular weights. Of more particular interest and importance has been the utilization of the differences in the configurations of the carbon and hydrogen atoms in the alkyl hydroxonium ions in accounting for the great differences in the reactions of the individual olefins in the formation of the alkyl hydroxonium ions and their role in the process of this invention and in other reactions including polymerization for example, which must be completely suppressed in the process of this invention as will be brought out hereinafter.

On the addition of olefins to aqueous sulfuric acid, the initial reaction is in the formation of alkyl hydroxonium in accordance with Equation 4 which is followed by the reaction of the olefins with the lyate ions in accordance with the equation (5) $\quad C_nH_{2n} + HSO_4^- = C_nH_{2n+1}SO_4$ The formation of the resultant alkyl lyate ion in accordance with Equation 5 is also in accordance with Markownikoff's rule in that, as a first step, the carbon atom in the reactant olefin having the least number of hydrogen atoms becomes bonded to the oxygen atom of the lyate ion from which the hydrogen atom was lost in the self-ionization reaction of Equation 1. This initial bond is a double bond formed by interaction of the two paired but uncoupled electrons of the olefin molecule with the paired electrons of the lyate ion one of which is the extra electron received by the lyate ion in its formation in accordance with Equation 1. The double bond forming the alkene group initially present in the alkyl lyate ion has only a transitory existence due to its re-arrangement to an alkyl group the formation of which consists in the acceptance by the hydroxyl group of an electron from the double bond accompanied by the switching of the hydrogen atom from the second hydroxyl group to the carbon atom bonded to the oxygen atom. Having a pair of uncoupled electrons, the alkyl lyate ion can accept another olefin molecule in accordance with the equation (6) $C_nH_{2n+1}SO_4^- + C_nH_{2n} = (C_nH_{2n})(C_nH_{2n+1})SO_4^-$ The resultant ion of Equation 6 is an alkene alkyl lyate ion since it contains both an olefinic and a paraffinic group. The double bond in the olefinic group has only a transitory existence due to the reaction in accordance with the equation (7) $(C_nH_{2n})(C_nH_{2n+1})SO_4^- + H_3SO_4^+$
$= (C_nH_{2n+1})_2SO_4 + H_2SO_4$ Among the considerations of importance in the delineation of the reaction of Equation 7 is the very great tendency of the alkene group to acquire another hydrogen atom which, as in the reaction of Equation 5, becomes bonded to the carbon atom which in turn is bonded to the oxygen atom of the hydroxyl group in the formation of the second alkyl group of the di-alkyl sulfate. The hydrogen atom acquired in the formation of the second alkyl group must come, of course, from the lyonium ion and the transfer of the hydrogen atom is accompanied by the switching of an electron in the opposite direction with the resultant formation of the uncharged sulfuric acid and the di-alkyl sulfate molecule which can only be neutral. The sulfuric acid liberated in Equation 7 is available for its further self-ionization in accordance with Equation 1 and the attainment of chemical equilibrium in the formation of the di-alkyl sulfate.

The reactions of Equations 1–7 inc. are operative in the reactions of all olefins with aqueous sulfuric acid only in the event that the reaction conditions are in accordance with the specifications for the process of this invention as will be delineated in detail hereinafter. The temperature required for a close approach to the equilibrium corresponding to the stoichiometric reactions differs greatly for the different olefins dependent on the type and molecular weight. Not only is this equilibrium different for different olefins, but the kinetics of the reactions is greatly different in the approach to the equilibrium. Of primary interest in the delineation of the great differences in the chemical reactivities of the different olefins is an elucidation of the highly exceptional behaviour of ethylene, an outstanding characteristic of which is the fact that as the water content of the sulfuric acid is decreased the extent to which ethylene reacts approaches a maximum of 1.5 mols ethylene per mols of sulfuric acid, whereas all other olefins approach as a limit the theoretically complete conversion of the sulfuric acid to the di-alkyl sulfate with the reaction of 2.0 mols of olefin per mol of acid. In order to account for this highly exceptional behaviour of ethylene and the great differences in the reactivities of other olefins, the very complex roles of various reaction intermediates must be delineated. Among these intermediates is the mono-alkyl sulfate which is present at equilibrium as a result of the reaction of the equation (8) $C_nH_{2n+1}SO_4^- + H_3SO_4^+ = C_nH_{2n+1}HSO_4 + H_2SO_4$ The reaction of Equation 8 is substantially coincident with the formation of the alkyl lyate ion in accordance with the reaction of Equation 5 and must precede the completion of the reaction in the formation of the di-alkyl sulfate in accordance with Equation 7. This means, of course, that both the mono-alkyl sulfate and the di-alkyl sulfate are invariably present together in the reactions leading to the equilibrium in the reactions of olefins with sulfuric acid. By the addition of Equations 1, 5, 6, 7 and 8, it follows that in its reactions with olefins, all of the sulfuric acid is consumed when the ratio of the di-alkyl sulfate to mono-alkyl sulfate is 1.0. The justification for this addition in the elucidation of the mechanism is had in the exceptional behaviour of ethylene in that in its reaction with highly concentrated sulfuric acid, the limiting reaction ratio is 1.5 mols of ethylene per mol of sulfuric acid. The fact that all olefins other than ethylene react with highly concentrated sulfuric acid in a ratio greater than 1.5 mols of olefin per mol of acid is accounted for by the continued reaction which results from the self-ionization of the mono-alkyl sulfate in accordance with the equation (9) $2C_nH_{2n+1}HSO_4 = C_nH_{2n+1}SO_4^- + C_nH_{2n+1}H_2SO_4^+$ The self-ionization of the mono-alkyl sulfate as in the reaction of Equation 9 is the result of the switching of an electron and a hydrogen atom between two molecules paralleling the self-ionization of sulfuric acid as discussed in the presentation of Equation 1. Justification of the reaction of Equation 9 is had in the difference in the structure of ethyl hydrogen sulfate from that of other mono-alkyl sulfates. Ethyl hydrogen sulfate is unique in that it has only secondary and primary hydrogen atoms and no tertiary hydrogen atoms. Primary hydrogen atoms are those bonded to a carbon atom which in turn is bonded to only one other carbon atom. Secondary hydrogen atoms are those bonded to a carbon atom which is itself bonded to two carbon atoms, while tertiary hydrogen atoms are those bonded to a carbon atom which is bonded to three carbon atoms. Strictly speaking, ethyl hydrogen sulfate has no secondary hydrogen atoms, since the second carbon atom is bonded to an oxygen atom and a carbon atom and not to two carbon atoms. In cognizance of this fact, the second carbon atom of ethyl hydrogen will be referred to hereinafter as a pseudo secondary carbon atom and its two hydrogen atoms as pseudo secondary hydrogen atoms. Likewise, since the middle carbon atom of propyl hydrogen sulfate is bonded to the oxygen atom and to two other carbon atoms, its hydrogen atom is a pseudo tertiary hydrogen atom. In other words the carbon atoms of the propyl group are in the 1-methyl ethyl configuration. Similarly, the straight chain butylenes react in the formation of n-butyl hydrogen sulfate which has its carbon atoms in the 1-methyl propyl configuration. Thus, as in the case of propyl sulfates, a pseudo tertiary hydrogen atom is a component of the n-butyl hydrogen sulfate. In contrast, when isobutylene reacts in the formation of isobutyl hydrogen sulfate, its carbon atoms are in the 2-methyl propyl configuration and thus, it has a tertiary hydrogen atom instead of the pseudo tertiary hydrogen atom. From the extension of the exclusion principle, it follows that tertiary hydrogen atoms are far more reactive than pseudo tertiary hydrogen atoms in the self-ionization of mono-alkyl sulfates. Neither secondary nor pseudo secondary hydrogen atoms participate in the self-ionization reactions. These conclusions are, of course, in conformity with the well known data referred to in the foregoing which establish the decreasing reactivity of isobutylene, n-butylenes, propylene and ethylene in this order. The chemical mechanism which has been deduced makes possible the further conclusion that the tertiary and pseudo tertiary hydrogen atoms are exchanged with the electrons in the self-ionization of mono-alkyl sulfates in accordance with Equation 9. Since ethyl hydrogen sulfate does not have either tertiary or pseudo tertiary hydrogen atoms, it follows that ethyl hydrogen sulfate does not undergo self-ionization in accordance with the reaction of Equation 9, and that therefore, the reaction of ethylene with concentrated sulfuric acid is limited to 1.5 mols of ethylene per mol of acid as stated in the foregoing. Since olefins other than ethylene react in the formation of mono-alkyl sulfates that have either tertiary or tertiary hydrogen atoms, they do react with concentrated sulfuric acid in a mol ratio greater than 1.5 through self-ionization of the mono-alkyl sulfate in accordance with Equation 9, the resultants of which participate in the formation of the di-alkyl sulfate in reactions paralleling the reactions of Equations 6 and 7, with the eventual conversion of all of the mono-alkyl sulfates into di-alkyl sulfate with only the stoichiometric amount of the olefin available for reactions, as will be delineated in more detail hereinafter.

The further delineation of the inner mechanism of the reactions of Equations 1–9 inc. through recourse to the extension of the exclusion principle has furnished the basis for the specific conditions which account for the selective reaction of the individual olefins in the process of this invention. Thus, in a mixture of the butylenes with propylene, the isobutylene can be reacted and recovered completely in high purity following which the straight chain butylenes can be recovered substantially free from the propylene. The basis for this selective reaction of the olefins is in the formation of the alkene alkyl lyate ion of Equation 6. The much greater reactivity of isobutylene in this reaction is due to its carbon atoms being in the 2-methyl propyl configuration with the extra electron being coupled on the tertiary carbon atom. Since in the case of both the straight chain butylenes and propylene, the extra electron is coupled on the pseudo tertiary carbon atom, therefore, the selectivity is much less than in the case of isobutylene.

Even though the specifications for the process of this invention preclude any possibility of the occurrence of any polymerization or fragmentation reactions, it is well to delineate the mechanism of the initiation of these reactions as a matter of information pertinent to the eventualities which ensue, in the event that the specifications of this invention are not followed. The specifications for the process of this invention provide for the reaction of olefins with sulfuric acid when the mol ratio of the sulfuric acid to water in the reactant aqueous sulfuric acid is greater than 1.5 which corresponds to 89.0% sulfuric acid by weight. When the sulfuric acid content of the reactant aqueous sulfuric acid is less than 1.5 mols per mol of water, the alkyl lyate ions formed by the reaction of olefins with the lyate ions in accordance with Equation 5 undergo double ionization by the acquisition of an electron from a water molecule which receives in exchange a teritary or pseudo tertiary hydrogen atom from the alkyl lyate ion in accordance with the reaction of the equation

(10) 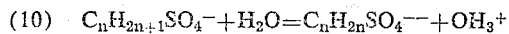

The doubly ionized alkyl lyate of Equation 10 is a highly unstable substance having a definite, but only transitory existence due to the paired electrons at the sites from which the tertiary or pseudo tertiary hydrogen atom is removed. This instability leads to the rupture of carbon-carbon bonds of the doubly ionized alkyl lyate with its loss of methylene groups individually which are transferred to the hydroxonium ion. The number of methylene groups removed is such that the doubly ionized alkyl lyate has a terminal methylene group to which is bonded the two paired but uncoupled electrons. Thus, following the double ionization of the propyl lyate ion in accordance with Equation 10, the reaction continues with the addition of two methylene groups to the hydroxonium ion which then becomes an ethyl hydroxonium ion with the final methylene group remaining as required for the formation of the doubly ionized methylene lyate ion. Having a pair of terminal electrons, the methylene lyate ion can initiate the chain reactions characteristic of polymerization whereby olefin molecules are added, successively in a configuration such that the terminal carbon atom of the growing chain is the doubly ionized alkyl ion having always a pseudo secondary carbon atom being bonded as it is to the one terminal carbon atom and to one of the terminal paired electrons. Thus, after the addition of the first molecule of propylene, the carbon atoms of the doubly ionized alkyl lyate ion are in the 2-methyl propyl configuration and the successive addition of propylene molecules conforms to the 1-methyl ethyl (iso-propyl) configuration. Similarly, in the reaction of the straight chain butylenes under conditions such that the doubly ionized lyate ions are formed, the molecule is ruptured originally with the formation of the doubly ionized methylene lyate ion and a propyl hydroxonium ion. With the addition of the first straight chain butylene molecule the doubly ionized ion is in the 2-methyl butyl configuration while the successive addition of straight chain butylenes leaves a terminal group in the 1-methyl propyl configuration. In contrast, in the reaction of isobutylene in the formation of doubly ionized alkyl lyate ion, the initial carbon-carbon bond rupture results in the formation of the doubly ionized ethylene lyate ion and an ethyl hydroxonium ion. Following the addition of the first mol of isobutylene to the growing chain the alkyl lyate ion is in the 3,3 dimethyl butyl configuration. It is not worthwhile to pursue the polymerization reaction further in the delineation of the mechanism which determines its chain length or its termination and the configuration of the end product which is a mono-alkyl sulfate of high molecular weight. The mechanism of the complete polymerization reactions are not a part of the process of this invention. It is sufficient to show that the basis of the specifications of the process of this invention precludes the polymerization reactions which are initiated in accordance with the reactions in the formation of the doubly ionized alkyl lyate ion as delineated in the immediately foregoing. But for the sake of completeness it must be emphasized also that the alkyl lyate ions can become doubly ionized in accordance with the reaction of the equation

(11) 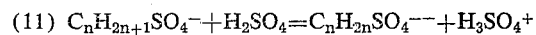

Following its double ionization in accordance with Equation 11, carbon-carbon bond rupture (fragmentation) and polymerization proceed very much the same as already delineated by some examples cited in the foregoing following the presentation of Equation 10. It is to be understood that as a result of the fragmentation of the resultant doubly ionized alkene lyate ion of Equation 11, the methylene groups will be added to the lyonium ions in the event that hydroxonium ions are not available for acceptance of the methylene groups which must be removed from the doubly ionized alkene lyate of Equation 11 as required for the initiation of the fragmentation and polymerization reactions.

Since the objective of the process of this invention is the recovery of olefins, it must follow that provision be made for the complete elimination of the fragmentation reactions of Equations 10 and 11 and the polymerizations which ensue. The assurance that there will be no sulfuric acid available for the initiation of the fragmentation reactions in accordance with the reaction of Equation 11 is had in the fact that provision is made for the necessary excess olefin required for the completion of the reactions of Equations 1, 5, 6, 7, 8 and 9 in the formation of the alkyl sulfates. The assurance that no water is available for the initiation of the fragmentation reaction of Equation 10 is had in the fact that some of the water reacts with the lyonium ions in the formation of hydroxonium ions in accordance with Equation 2 while the hydroxonium ions in turn react, at least partially, in the formation of alkyl hydroxonium ions in accordance with Equation 4. That portion of the water which becomes ionized by its direct reaction in the formation of the bisulfate ions does not lead to polymerization as has been set forth in the presentation of Equation 3 in the foregoing. As the reactions in the formation of the di-alkyl sulfate approach completion, the alkyl hydroxonium ion formed in accordance with Equation 2 are consumed in their reaction with bisulfate ions in the reaction of the equation

(12) 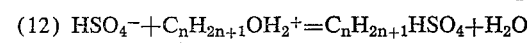

The resultant mono-alkyl sulfate and water of Equation 12 are, in fact, reaction intermediates of only transitory existence because of their reaction in accordance with the equation

(13) $C_nH_{2n+1}HSO_4 + H_2O = C_nH_{2n+1}SO_4^- + OH_3^+$

It must be understood that the negative ion of Equation 13 is the alkyl lyate ion since its origin is due to the self-ionization of sulfuric acid to which is traceable formation of the alkyl hydroxonium ion through Equations 2 and 4 and finally the formation of mono-alkyl sulfate of Equation 12. That the reaction of Equation 13 is initiated prior to the completion of the self-ionization of sulfuric acid in accordance with Equation 1 is established by the fact that the reactant mono-alkyl sulfate is a high energy reaction intermediate due to its tertiary or pseudo tertiary hydrogen atoms which are highly reactive as is known from the role of these hydrogen atoms in the initiation of the fragmentation reactions as set forth in presentation of Equations 10 and 11 in the foregoing. This conclusion has been drawn from the fact that the resultant alkyl lyate of Equation 13 also has a tertiary or pseudo tertiary hydrogen atom which being responsible for the reactions of Equations 10 and 11 also account for the reaction of the equation

(14) $C_nH_{2n+1}SO_4^- + H_2O = SO_4^{--} + OH_3^+ + C_nH_{2n}$

The formation of the doubly ionized sulfate ion accompanied by the liberation of a mol of olefin in accordance with the reaction of Equation 14 follows from the fact that water is available for this reaction only after its liberation from the alkyl hydroxonium ion in accordance with the reaction of Equation 12. The resultant olefin of Equation 14 is a reaction intermediate available for the formation of di-alkyl sulfate in accordance with the reactions of Equations 1, 5, 6, 7, 8 and 9.

An inspection of all the reactions pertinent to the process of this invention which have been delineated in the foregoing presentation of Equations 1–14 inc. has revealed the importance of their consideration in two groups, in the first of which are the reactions involving the reactions of sulfuric acid with olefins in the formation of di-alkyl sulfates together with the reaction intermediates of Equations 1, 5, 6, 7, 8 and 9, while in the second group are the reactions of sulfuric acid with water and the reaction intermediates as delineated in Equations 2, 3, 4, 12, 13 and 14. The first group of reactions have their origin in the self-ionization of sulfuric acid involving two mols of acid which culminate in the formation of two mols of di-alkyl sulfate in accordance with the overall reaction

(15)     $2H_2SO_4 + 4C_nH_{2n} = 2(C_nH_{2n+1})_2SO_4$

The overall reaction of Equation 15 is the result of the addition of all the reactions of the first group of reactions referred to in the immediately foregoing. The overall reaction of water with sulfuric acid is in accordance with the Equation

(16)     $H_2SO_4 + 2H_2O = SO_4^{--} + 2OH_3^+$

The overall reaction of Equation 16 is the result of the addition of all the reactions of the second group referred to in the immediately foregoing. An inspection of Equations 15 and 16 shows that for each mol of water present in the reaction mixture, there must be a minimum of 1.5 mols of sulfuric acid which corresponds to 89.0% $H_2SO_4$ by weight which is the minimum concentration of the acid which can be reacted with excess olefins in the exclusive formation of di-alkyl sulfates. Any less concentrated acid will involve some fragmentation and polymerization as pointed out in the presentation of Equation 10 in the foregoing. With the presence of a detectable amount of olefin in excess of four mols of olefin for each three mols of acid in the sulfation reaction mixture of the process of this invention, the fragmentation and polymerization reactions will be avoided for reasons cited in the presentation of Equation 11 in the foregoing. From an inspection of Equations 15 and 16 it follows that the relationships are applicable as in the equation

(17)     $R = 2.0 - 1/A$

In Equation 17, R symbolizes the mols of olefin reacted per mol of acid while A represents the mol ratio of acid to water in the reactant aqueous sulfuric acid. It is to be re-emphasized that Equation 17 is valid for the substantially maximum possible utilization of both the acid and the olefin in the formation of di-alkyl sulfates when the mol ratio of the acid to olefin is greater than 1.5.

The delineation of the reaction mechanism which establishes the necessity for a minimum ratio of 1.5 mols of sulfuric acid for each mol of water in the sulfation reaction mixture, as presented in the foregoing, has furnished the basis for the removal of some of the olefins by the hydrolysis of the di-alkyl sulfates. As soon as the rich solution of di-alkyl sulfates is diluted with water to the point at which the sulfuric acid to water mol ratio is less than 1.5, since then some of the acid is available for its direct ionization by its reaction with water in accordance with Equation 3, whereupon a corresponding amount of olefin is released as demanded by the chemical equilibrium. The initial reaction on the addition of the water in the hydrolysis stage is in accordance with the equation

(18)
$(C_nH_{2n+1})_2SO_4 + H_2O = C_nH_{2n+1}SO_4^- + OH_3^+ + C_nH_{2n}$

The inner mechanism of the reaction of Equation 18 is the exchange of a tertiary or a pseudo tertiary hydrogen atom of the di-alkyl sulfate for an electron donated by the water molecule with the formation of an alkyl lyate ion. The other products are the hydroxonium ion and a mol of olefin in the absence of the self-ionization required for the formation of the alkyl hydroxonium ion. The complete liberation of the olefin follows from the destruction of the alkyl lyate ion of Equation 18 in the reaction of Equation 14 which for convenience is repeated here

(14) $C_nH_{2n+1}SO_4^- + H_2O = SO_4^{--} + OH_3^+ + C_nH_{2n}$

By the addition of Equations 18 and 14, there is obtained the equation

(19) $(C_nH_{2n+1})_2SO_4 + 2H_2O = SO_4^{--} + 2OH_3^+ + 2C_nH_{2n}$

The resultant doubly ionized sulfate ion of Equation 19 is a reaction intermediate of only transitory existence due to its disappearance in the reaction of the equation

(20)     $SO_4^{--} + 2OH_3^+ = HSO_4^- + OH_3^+ + H_2O$

The reaction of Equation 20 in the formation of the bisulfate ion along with the substantially complete destruction of the mono-alkyl sulfate in accordance with Equations 13 and 14 will be the result when all the sulfuric acid is accounted for in the overall reactions of Equations 15 and 16. By the addition of Equations 19 and 20 we have the equation

(21) $(C_nH_{2n+1})SO_4 + H_2O = HSO_4^- + OH_3^+ + 2C_nH_{2n}$

The overall hydrolysis reaction of Equation 21 would be quite meaningless without recourse to the precursory reactions which have been identified for the first time and delineated in the foregoing. In particular, the overall hydrolysis reaction of Equation 21 can be seen to be the result of the reaction which follows from the addition of one mol of water to the sum of the resultants of Equations 15 and 16 to obtain the equation

(22)
$2(C_nH_{2n+1})_2SO_4 + SO_4^{--} + 2OH_3^+ + H_2O =$
$3HSO_4^- + 3OH_3^+ + 4C_nH_{2n}$

The reactant di-alkyl sulfate of Equation 22 is the resultant of the self-ionization of sulfuric acid as established in the presentation of Equation 15 in the foregoing while the reactant sulfate ion and the reactant hydroxonium ions are the resultants of the reaction of the maximum amount of water which can accompany the formation of the di-alkyl sulfate without polymerization and other side reactions as delineated in the identification of the precursors of the resultants of Equation 16. The reactant water of Equation 22 can be regarded as that required for the complete reaction of the sulfuric acid in the formation of bisulfate and hydroxonium ions leaving none for its self-ionization without which no olefin can be reacted. In actual practice, the amount of water added for the overall hydrolysis reaction of Equation 22 will be somewhat less than the amount demanded by stoichiometry and by so doing some di-alkyl sulfate will remain unreacted while all of the water will be ionized leaving none for the formation of the doubly ionized alkyl sulfate the preclusion of which gives assurance that there will be no polymerization or other side reactions and that substantially all of the olefins reacted in the formation of alkyl sulfates will be recovered. The ionic resultants of the overall hydrolysis reaction of Equation 22 furnishes the basis for its control by the determination of the electrical conductance of the acid phase of the hydrolysis reaction mixture which will be a maximum when the reaction is completed in accordance with the specifications of this invention. The hydrolysis reaction being highly endothermic demands large heat inputs at temperatures higher than those required in other stages of the process. Hereinafter the techniques will be disclosed whereby the heat requirements of the hydrolysis reaction can be supplied largely by heat exchange including as it does the condensation in the hydrolysis reactor of water vaporized in the dehydration of the recycled stream of di-alkyl sulfate.

The preparation of the substantially anhydrous recycled di-alkyl sulfate by the vaporization of water in the dehydration stage of the process of this invention is based on the elucidation of phenomena well known but previously unexplained, in the reaction of olefins other than ethylene with concentrated sulfuric acid. It has been observed that the boiling points of solutions of alkyl sulfates prepared without polymerization by the reactions of olefins with sulfuric acid are far lower than the boiling point of the sulfuric acid used in the preparation of the solutions. This reduction in boiling point becomes greater rapidly as the sulfuric acid to water ratio is increased in the reactant acid. From a conventional standpoint, the explanation of the phenomena would proceed no farther than recognition of the fact that the "affinity" of olefin is greater for sulfuric acid than it is for water. The elucidation of this phenomenon has been made an asset of great value in the development and establishment of the process of this invention by the delineation of the inner mechanism of the reaction of Equation 18 referred to above and the distinctive role of this reaction in both the sulfation and dehydration stages of the process of this invention. When the mol ratio of sulfuric acid to water in the sulfation reaction mixture is equal or greater than 2.0, all of the one mol of water present is accounted for completely by the endothermic reaction of Equation 18. Preferably in the process of this invention the sulfation reaction mixture is composed of not less than one mol of anhydrous di-alkyl sulfate combined with one mol of hydrolysis acid which itself is composed of one mol of acid and one mol of water which latter is completely consumed in its reaction with the di-alkyl sulfate in accordance with Equation 18 leaving the one mol of acid for its complete self-ionization and eventual complete utilization in the formation of di-alkyl sulfate following the self-ionization of the alkyl hydrogen sulfate in accordance with Equation 9. For emphasis Equation 9 is repeated here as follows (9) $2C_nH_{2n+1}HSO_4 = C_nH_{2n+1}SO_4^- + C_nH_{2n+1}H_2SO_4^+$ The alkyl lyate ion of Equation 9 reacts with olefin in the formation of the alkene alkyl lyate ion of transitory existence in accordance with Equation 6 which is repeated here as follows (6) $C_nH_{2n+1}SO_4^- + C_nH_{2n} = (C_nH_{2n})(C_nH_{2n+1})SO_4^-$ The alkene alkyl lyate ion of Equation 6 reacts with the alkyl lyonium ion of Equation 9 in the reaction of the following equation

(23)
$C_nH_{2n}C_nH_{2n+1}SO_4^- + C_nH_{2n+1}H_2SO_4^+ =$
$(C_nH_{2n+1})_2SO_4 + C_nH_{2n+1}HSO_4$

As long as there is any olefin whatever present in the sulfation reaction mixture it is completely consumed in the reaction of Equation 6 which in turn is completely consumed in the reaction of Equation 23. The resultant alkyl hydrogen sulfate of Equation 23 undergoes its self-ionization in accordance with Equation 9 and the amount of alkyl hydrogen sulfate approaches zero as long as there is olefin present for its reaction in accordance with Equation 6. The substantially complete utilization of alkyl hydrogen sulfate culminating in the reaction of Equation 23 is dependent on the complete utilization of the water in the reaction of Equation 18 leaving no water for the consumption of alkyl hydrogen sulfate in the formation of the doubly ionized sulfate ion which results from the reactions in accordance with Equations 13 and 14. For assurance that all of the water will be consumed in accordance with Equation 18 with preclusion of the reaction of any of the acid in the reactions of Equations 13 and 14, it is advantageous to recycle more than 2.0 mols of anhydrous di-alkyl sulfate for each mol of water present for reaction in the sulfation reaction mixture. When the sulfation reaction is carried to completion with the reaction of more than two mols of anhydrous di-alkyl sulfate present in the initial sulfation reacting mixture, and when the sulfation reaction is completed in accordance with Equation 23 then on reduction of the temperature of the effluent from the sulfation reaction which occurs in the dehydration stage, the ionic resultants of Equation 18 are consumed in the reaction of the equation

(24) $C_nH_{2n+1}SO_4^- + OH_3^+ = C_nH_{2n+1}HSO_4 + H_2O$

In the presence of the large excess of olefin in the dehydration stage, the resultant alkyl hydrogen sulfate of Equation 24 is completely consumed in the reaction leading up to and concluding with the reaction of Equation 23 as delineated in the foregoing. The net result is that the resultant water of Equation 24 being completely free of acid is available for its vaporization at the vapor pressure of water, and not at the vapor pressure of acid. While the reactions which occur in the dehydration stage are exothermic some heat must be supplied for the vaporization of the water as will be delineated further in the presentation hereinafter of the heat balance of the process of this invention.

The complete specifications of the process of this invention have been made possible only as a result of the complete delineation of its chemical mechanism including its inner mechanism based on the extension of the exclusion principle all as included in the foregoing. The chemical mechanism has been presented before giving a detailed description of the process which otherwise would be wholly unacceptable departing as it does from the viewpoint available to others heretofore as a result of the unavailability to others of a mechanism which accounts for all of the extant data pertinent to the reactions of aqueous sulfuric acid with olefins. The complete specifications for the process of this invention makes possible some of its potential applications by those conversant with processes available heretofore for the beneficiation of hydrocarbons by their reaction with sulfuric acid even though they are not interested in the delineation of the chemical mechanism and inner mechanism of the process of this invention. The complete delineation of this invention will be helpful in the realization of some of its potentialities all of which can not be envisaged completely now.

The description of the process of this invention to follow will be facilitated by reference to its accompanying diagrammatic illustration in which numerals are used to designate its various features of especial importance. In the accompanying diagrammatic sketch the numeral 1 designates a line through which is received from an undesignated source, the feed olefin or olefins usually in dilute concentration in other olefins and other hydrocarbons and, possibly, in other substances. The feed is delivered by pump 2 through line 3 into line 4 into which there is also delivered from line 5 the combined recycle streams of alkyl sulfates and hydrolysis acid from sources to be identified hereinafter. The combined stream of the feed olefins and recycle streams which constitutes the sulfation reaction mixture is delivered through line 4 into heat exchanger 6 in which the sulfation reaction mixture is preheated by heat exchange with the vapors from the hydrolysis reactor, the composition of which will be given hereinafter. The preheated sulfation reaction mixture is discharged through line 7 into heat exchanger 8 so placed near the top of the separating vessel 9 that heat is recovered by exchange with the non-reactive hydrocarbons introduced with the feed olefins and which are completely vaporized in the formation of the alkyl sulfates. From the heat exchanger 9, the reacting mixture is delivered through line 10 into the bottom of separating vessel 9 in which there is placed a heating coil 11 through which is passed an appropriate heating medium for maintaining the temperature of the reacting mixture as required for the desired approach to the completion of the sulfation reaction. The alkyl sulfates are withdrawn through line 12 from a point in separating vessel 9 such that the heating coil 11 is submerged in the reacting mixture and such that the acid phase of the reacting mixture will have the specified residence time. The ascending vapors pass through the contacting device 13 which may be bubble trays placed in the separating vessel 9 for the countercurrent contact of the vapors with any descending liquid which may be some di-alkyl sulfates condensed as a result of the cooling of the vapors by the passage of the reacting mixture through the heat exchanger coil 8. The vapors leaving the separating vessel 9 through line 14 pass through cooler 15 in which the temperature of the vapors is reduced as required for their passage through line 16 into separating vessel 17 from the bottom of which condensed hydrocarbons are withdrawn through line 18 from which the condensate is delivered by pump 19 through line 20 for such disposition as may be appropriate. In the event that sub-atmospheric pressures are required for the complete vaporization of the hydrocarbons in separating vessel 9, the non-condensible gas passes from separator 17 through lines 21 and 22 and are discharged by vacuum pump 23 through line 24 usually to waste. In the event that the hydrocarbons are completely vaporizable in separating vessel 9 at super-atmospheric pressures, the gases are discharged from separating vessel 17 through lines 21 and 25 in which latter there is placed the pressure regulating valve 26 by means of which the pressure in separating vessel 9 may be controlled as desired while discharging the hydrocarbon gases through line 27 for their appropriate disposition. Depending on the pressure in separating vessel 9, in many applications of the process of this invention the hydrocarbons will be completely vaporized in separating vessel 9 at a pressure adequate for the discharge of the alkyl sulfates through the subsequent stages of the process. In those applications in which the pressure in separating vessel 9 is inadequate, the alkyl sulfates delivered therefrom through line 12 will be discharged from line 12 by means of pump 28 through line 29 from which a portion of the alkyl sulfates will be delivered through line 30 into the dehydration stage at a rate regulated by valve 31 for the processing to be described hereinafter. The other portion of the alkyl sulfates will be discharged from line 29 into line 32 from which through line 33 a portion of the alkyl sulfates may be withdrawn through cooler 34 at a rate controlled by regulating valve 35 for discharge through line 36 for their appropriate utilization in the manufacture of alcohols or other processes. From line 32 a portion of the alkyl sulfates is directed through line 37 into which there is received through line 38 the vapors from the dehydration stage consisting of water vapor and the recycled gaseous olefins. The stream of alkyl sulfates passing from the dehydration stage through line 37 will be so proportioned to the stream of recycled olefin and water vapor passing from the dehydration stage through line 38 that there will be no possibility of the initiaton of the fragmentation and polymerization in the reactions of Equations 10 and 11. To this combined stream of alkyl sulfates and vapors from the dehydration stage passing through line 39 may be added through line 40 some recycled gaseous olefin and this entire mixture delivered through line 41 into bottom of the hydrolysis vessel 42. Dilute sulfuric acid such as that produced in the manufacture of alcohols, or concentrated sulfuric acid such as the spent acid from the sulfuric acid alkylation process may be received through line 43 and discharged by pump 44 through line 45 into the hydrolysis vessel 42. In the event that dilute acid is not available water is introduced into hydrolysis vessel 42 through line 46 from a source to be identified hereinafter. The elevated temperature at which the hydrolysis reaction is carried out is maintained largely by the condensation of steam which is introduced with recycled olefin from the dehydration stage through lines 38 and 39 in combination with the alkyl sulfates from line 37 to which reference has been made in the foregoing. Additional heat is supplied to the hydrolysis stage by means of an appropriate heating medium introduced through the coil 47 submerged in the acid in the hydrolysis vessel 42. The proportioning of the various streams entering hydrolysis vessel 42 will be dependent on the heat balance of the overall process as discussed hereinafter. The vapors evolved in hydrolysis vessel 42 consisting of steam in admixture with the recycle olefin and the volatile product olefins are directed through line 48 into the heat exchanger 6 in which the vapors from the hydrolysis vapors by their partial condensation serve to preheat the sulfation reaction mixture as stated in the foregoing. From the heat exchanger 6 through line 49, the condensate and non-condensable gases are delivered into the cooler 50 from which through line 51 the mixture at the desired final temperature is delivered into the separating vessel 52. That portion of the product olefins which is liquefiable is withdrawn from separator 52 through line 53 from which it is delivered by pump 54 through line 55 for storage and utilization. The gaseous olefins are discharged from the top of separating vessel 52 through lines 56 and 57 in which latter a regulating valve 58 is placed for the control of the pressure in the hydrolysis vessel 42 and separating vessel 52 and for the regulation of the rate at which the product gaseous olefins are discharged through line 59 for their appropriate utilization. Water is withdrawn from separating vessel 52 through line 60 into line 61 from which it is discharged by pump 62 through line 63 to waste or other appropriate disposition. When weak acid is not available for charging to the hydrolysis vessel 42, water is withdrawn from line 60 through line 64 into pump 65 which discharges water through line 46 as required for the dilution of the acid in hydrolysis vessel 42 as stated previously. Any olefins not vaporizable in the hydrolysis vessel 42 are withdrawn along with the acid through line 66 into separating vessel 67 from which through line 68 by means of pump 69 the liquid olefins are discharged through line 70 for storage and appropriate utilization. The temperature of separating vessel 67 must be maintained at least as high as the temperature of the hydrolysis reactor 42 in order to avoid the polymerization reactions of the olefins which occurs at reduced temperatures. For this reason there is placed in the separating vessel 67, the heating coil 71 through which is passed an appropriate heating medium. From the separating vessel 67 through line 72 the hydrolysis acid is withdrawn for recycling as described hereinafter. The recycled normally gaseous olefins are withdrawn from the separator 52 through line 56 into line 73 and by means of blower 74 is discharged through lines 75 and 76 into the bottom of stripping tower 77 of the dehydration stage. Any make-up of the normally gaseous recycle olefins as may be required in some applications of the process of this invention is received from an undesignated source through line 78 and by means of compressor 79 is delivered through line 80 into line 76 and, thus in admixture with the recycle gas, is delivered into the stripping tower 77 to which reference has been made already. The stripping tower 77 is equipped with devices 81 such as bubble trays for the countercurrent contacting of the ascending gaseous olefins with a descending stream of alkyl sulfates containing water and at an elevated temperature as it enters the top of stripping tower 77 through line 82. The stream of gaseous olefins discharged from the top of stripping tower 77 containing water vapor at a temperature lower than 200° F. passes through line 83 and mixes with the alkyl sulfates from the sulfation stage in the previously mentioned line 30 and this mixture then is introduced through line 84 into the heating vessel 85. Through the heating coil 86 is passed an appropriate heating medium for maintaining the temperature in the heating vessel 85 at the temperature required for the vaporization of substantially all of the water contained in the alkyl sulfates entering the dehydration stage. The withdrawal of the liquid phase from the heating vessel 85 through line 82 is from a location such that the heating coil 86 is submerged in the acid phase of the dehydration reaction mixture in the heating vessel 85. The amount of heat added in heating vessel 85 is such that as a result of the continued sulfation reaction and further removal of water by the stripping action of the recycled gaseous olefin in stripping tower 77, the di-alkyl sulfate stream leaving stripping tower 77 through line 87 is substantially anhydrous. From line 87 through line 88 by means of pump 89 the di-alkyl sulfate stream can be discharged through line 90 for disposition and utilization in proportion to the amount of acid introduced into the hydrolysis reactor through line 43 to which reference has been made in the foregoing. From line 87 through line 91 by means of pump 92 the recycled di-alkyl sulfate stream is discharged through line 93 and cooler 94 in which the stream is reduced in temperature, if required, for its discharge through line 95 into mixer 96. Into this mixer 96 there is also delivered the hydrolysis acid discharged from separator 67 through line 72 after its passage through exchanger coil 97 in the heating vessel 85 from which through lines 98 and 99 and by means of pump 100, the hydrolysis acid is discharged through lines 101 and 102 into cooler 103 from which at the desired reduced temperature, it is delivered through line 104 into mixer 96 which also receives the recycled stream of di-alkyl sulfate as stated in the foregoing. The mixer 96 must be a device suitable for the immediate and complete mixing of the di-alkyl sulfate and hydrolysis acid recycle streams for reasons to be given hereinafter. The combined stream of di-alkyl sulfate and hydrolysis acid is delivered from mixer 96 through line 5 into line 4 for admixture with the feed olefins in the preparation of the sulfation reaction mixture as stated in the foregoing. In some applications of the process of this invention some of the recycle gas will be taken from line 75 through line 105 in an amount regulated by valve 106 for passage through lines 40 and 41 for delivery into the hydrolysis reactor 42 in admixture with the alkyl sulfates from the sulfation stage and the vapors from the dehydration stage as stated in the foregoing. The gas recycle delivered directly to the hydrolysis reactor can be made available for heat recovery with appropriate heat exchangers not shown in the accompanying diagrammatic sketch, prior to its passage into the hydrolysis reactor stage. In some applications of this invention in which dilute or concentrated spent acids are introduced into the hydrolysis reactor 42 through line 43 either all or a portion of the acid thus introduced may be withdrawn from the process as hydrolysis acid containing 85% sulfuric acid by weight and containing negligible amounts of carbonaceous matter making it suitable for the ordinary requirements of commerce. Provision is made for this withdrawal of hydrolysis acid from line 98 through line 107 and by means of pump 108 it is discharged through line 109 for the required storage and appropriate utilization. Instead of withdrawing acid from the process for which provision has been made as delineated in the immediately foregoing more often the acid added to the hydrolysis reactor 42 through line 43 will be accounted for in the form of alkyl sulfates withdrawn through lines 36 or 99 to which reference has been made in the foregoing. In still other applications of this invention, acid will be added which is neither dilute nor spent acid. An example of such an application of the process of this invention is the use of a cycled stream of sulfuric acid from the sulfuric alkylation process to which further reference will be made hereinafter. Such additions are made from any appropriate source from which it may be received through line 110 and by means of pump 111 discharged through line 112 into line 101 for admixture with the hydrolysis acid to the end that the heat generated by the reaction of the hydrolysis acid with the more concentrated cycled alkylation acid can be dissipated by passage of the mixture through line 102 into cooler 103 prior to passage through line 104 into mixer 96 wherein the mixture of acids is combined with the recycled di-alkyl sulfates the same as already set forth in the foregoing.

From the foregoing description of the process of this invention it follows that its development and establishment has proceeded from the correlation of its various stages which may be summarized as follows:

(1) The mixing and proportioning of the combined liquid recycle stream composed of the dehydrated di-alkyl sulfates and the hydrolysis acid with emphasis on the fact that olefins are reacted with the acid from the hydrolysis stage combined in a prescribed manner and ratio with the recycled alkyl sulfates.

(2) The proportioning of the olefin feed stream to the combined recycle streams for the selective reaction of the desired olefins in the sulfation stage with complete vaporization of the undesired substances from the product di-alkyl sulfates.

(3) The dehydration stage in which by recourse to the recycle of normally gaseous olefins the sulfation reaction is carried to completion in the formation of di-alkyl sulfates with the vaporization of water from the di-alkyl sulfates.

(4) The hydrolysis stage in which by the addition of water largely in the form of water vapor from the dehydration stage there is substantially complete destruction of the di-alkyl sulfate with liberation and withdrawal of the product olefin as such and with the liberation of the recycle hydrolysis acid in which the mol ratio of the acid to water approaches 1.0 as closely as possible without exceeding this ratio.

The relationships between these various stages will be delineated in detail hereinafter.

With recourse to the accompanying diagrammatic illustration of the process of this invention together with its description presented in the foregoing, it is possible to fix for each of the various stages the limiting ranges of conditions within which operation is possible as well as the conditions preferred for obtaining the superior performance of the process. These specifications have been made possible by the delineation of the chemical mechanism as included in the foregoing, reference to which will facilitate an understanding of the basis of these specifications and their proper utilization. In this process for the recovery of olefins other than ethylene in high purity from their dilute concentrations, the first and highly important step is the correct proportioning of the alkyl sulfates from the dehydration stage to the sulfuric acid recycled from the hydrolysis stage in which the sulfuric acid to water mol ratio is maintained as close as possible to 1.0 but not less than 1.0, corresponding to 85% sulfuric acid by weight. In the presentation of Equation 16 in the foregoing it was brought out that in the sulfation reaction mixture in order to avoid fragmentation and polymerization reactions, the sulfuric acid to water mol ratio must be a minimum of 1.5. By the application of Equation 17 it follows that when using this minimum ratio, the mols of olefin per mol of acid in the reacted mixture, on completion of the reaction is 1.33. This reacted mixture would be obtained by recycling .5 mol of di-alkyl sulfate per mol of hydrolysis acid so that the net olefin reacted per mol of acid circulated would be .22 as obtained from the computation $$1.33 - .5 \times 2/1.5 = .22$$

From parallel computations it can be concluded that when one mol of the di-alkyl sulfate is recycled per mol of hydrolysis acid, the mols of olefin reacted per mol of hydrolysis acid in the reacted mixture is .5. This result is obtained by noting that in this example there are two mols of acid in the reacted mixture (one mol from the di-alkyl sulfate and one mol from the hydrolysis acid) and that the acid to water mol ratio is 2.0 (one mol of water from the hydrolysis acid and none from the di-alkyl sulfate) from which it follows from Equation 17 that there will be 1.5 mols of olefin per mol of acid in the reacted mixture $(2.0-1/2.0=1.5)$ so that the total mols of olefin in the reacted mixture is 3.0 of which 2.0 entered with the di-alkyl sulfate leaving 1.0 mol of olefin gained by the reaction or .5 mol of olefin per mol of acid in the reacted mixture, since 2.0 mols of acid must be accounted for in the sulfation reaction mixture. From further computations, it can be shown that as the ratio of recycled di-alkyl sulfates to the hydrolysis acid is increased above the mol ratio of 1.0, the mols of olefin reacted per mol of acid in the reacted mixture is less than .5, just as is to be expected from the chemical mechanism which have been delineated. But nothwithstanding the immediately foregoing and for reasons pertinent to the overall heat balance, in some applications of the process of this invention where heat recovery is justifiable and where improved selectivity in the extraction of individual olefins is desired, the mol ratio of recycled di-alkyl sulfates to hydrolysis acid will be greater than 1.0. In any event, the mols of olefins reacted per mol of hydrolysis acid will always be substantially 1.0 at the higher recycle rates of di-alkyl sulfates.

The immediately foregoing and similar computations serve to spotlight the advantages of the complete removal of the water in the dehydration stage and the substantially complete destruction of the alkyl sulfates in the hydrolysis stage, but since these advantages are so straightforward and the desired results are so readily attainable further delineation is not worthwhile. Furthermore, the computation for the proportioning of the stream from the hydrolysis stage to the di-alkyl sulfate from the dehydration stage is quite straightforward in the event that the composition of these streams do not conform exactly to the stoichiometric compositions which can be closely approached at chemical equilibrium.

In the foregoing reference has been made to the critical requirements of the techniques for the mixing of the recycled alkyl sulfates with the acid recycled from the hydrolysis stage and the proportioning of these recycle streams. The necessity for this emphasis on adequate mixing is due to the fact that in the interface which is always present between the two streams during mixing, the ratio of the di-alkyl sulfate to the hydrolysis acid is less than required for the preclusion of the reactions leading to fragmentation and polymerization in accordance with Equations 10 and 11 which have been delineated in the foregoing. The amount of this interface and, consequently, the extent of the fragmentation and polymerization reactions, is decreased as the mixing is made more effective by the device which is designated by the numeral 96 in the accompanying diagrammatic illustration. But since devices for the effective mixing of liquids having the characteristics of the recycled alkyl sulfate and recycled hydrolysis streams are well known and readily available, it is not important to specify the details of the design of the mixing device which will be adequate for utilization in the process of this invention. It is important to note that the undesirable reactions during mixing are minimized as the temperature of the streams undergoing mixing is reduced prior to their introduction into the mixing device 96. The reduction of the temperature of the recycle streams below that required for the avoidance of polymerization during mixing involves, of course, an increase in the heat requirements, since the combined recycle stream must be reheated for initiation of the sulfation reaction. The absence of polymerization during mixing can be established by the absence of a temperature increase during and following mixing. An increase in temperature during mixing can be detected by a temperature of the combined recycle streams higher than the temperature computed according to the mixture rule. Polymerization during mixing can be reduced by an increase of the mol ratio of the anhydrous di-alkyl sulfates to hydrolysis acid. But this ratio usually will be determined by other considerations to which reference has been made in the appropriate heat balance to which reference will be made hereinafter. In any event, the recycled di-alkyl sulfate will be so proportioned to the hydrolysis acid that in the combined recycle stream there will be more than 1.5 mols of sulfuric acid per mol of water. It is to be understood that the sulfuric acid in the mixture is considered to be the sum of the acid introduced as hydrolysis acid and that consumed in the formation of the di-alkyl sulfates. While the recycled di-alkyl sulfate stream will be substantially anhydrous, it is to be understood that the actual water content of the recycled di-alkyl sulfate will be taken into account in the proportioning of the recycle streams. Also it is to be understood that the exact olefin content of the di-alkyl sulfate must be known for assurance that there is at least the minimum acid to water ratio in the mixture. Likewise, instead of assuming that the hydrolysis acid contains only sulfuric acid and water in the specified or stoichiometric ratio, the carbon content of the hydrolysis acid should be known since presence of the high molecular weight alkyl hydrogen sulfates in the hydrolysis acid makes the hydrolysis acid less effective in the sulfation reaction. In addition to the recycled hydrolysis acid, the recycled di-alkyl sulfates will be mixed with acid from other sources such as a recycled stream from the sulfuric acid alkylation process to which reference has been made in the foregoing. The addition of acids from such sources does not change the critical requirements of the mixing techniques which can be met with the mixing equipment appropriate to the mixing of the hydrolysis acid alone, neither does the addition of such acid directly to the mixer change the specification of the mixture in which there must be at least 1.5 mols of acid per mol of water. The necessity for a minimum ratio of 1.5 mols acid to water is established from my findings pertinent to the reactions of Equations 15 and 16 which show that with this minimum ratio the polymerization and fragmentation reactions initiated by Equation 10 are precluded. But with this minimum ratio obtainable with the proportioning of only .5 mol of the di-alkyl sulfate to the hydrolysis acid of stoichiometry, there are present in the mixture only .66 mol of olefin per mol of acid, whereas in order to preclude the polymerization and fragmentation reactions of both Equations 10 and 11 it is necessary to have present in the reacted mixture at least 1.0 mol of olefin per mol acid plus 1.0 mol of olefin per mol of water. This preferred ratio can be had by the recycling of one mol of di-alkyl sulfate per mol of hydrolysis acid. This preferred ratio has the further advantage of improved heat recovery and better selectivity in the recovery of individual olefins as referred to in the foregoing. But notwithstanding the advantages of proportioning the recycled streams from the dehydration stage to the recycled stream from the hydrolysis stage so that in the combined recycle stream there is at least 1.0 mol of olefin for each mol of water, it is to be understood that the process of this invention is operable when the two recycled streams are so combined that there is a minimum of 1.5 mols of acid per mol of water in the combined recycle stream provided that the mixing of the two streams is effective at a sufficiently low temperature prior to the addition of the feed olefins.

When the mixture of the recycled streams of di-alkyl sulfate and hydrolysis acid is complete and with the specified proportioning of this mixture to the reactant olefins, the sulfation reacting mixture can be heated to the temperature required for completion of the sulfation reaction with the preclusion of the undesirable reactions of fragmentation and polymerization. The sulfation reaction mixture is initially prepared at a relatively low temperature therefore it must be preheated for initiation of the sulfation reaction at an appropriate rate. This preheating can be effected by the passage of the sulfation reacting mixture through heat exchangers 6 and 8 in which heat is recovered from the vapors from the hydrolysis and sulfation reactors respectively. Heat not thus recovered must be lost by its dissipation to cooling water for which provision is made as brought out in the accompanying diagrammatic sketch and in its foregoing description. The control and completion of the sulfation reaction will be most effective with recognition of the fact that even though the sulfation reaction is multi-molecular in accordance with its delineation in the foregoing presentation of Equations 11–23 inc., it is strictly first order being dependent, as it is, on the activation of a single molecule in the release of electrons which may be either in the formation of lyonium ions in the self-ionization of the acid itself as in the reaction of Equation 1, or in the self-ionization of alkyl hydrogen sulfate in the formation of alkyl lyonium ion in accordance with the reaction of Equation 9. Since it is exclusively first order, the course of the sulfation reaction can be followed by the determination of the electrical conductance or some other physical property of the acid phase of the sulfation reaction mixture. Deserving of particular emphasis is the fact that the determination of the electrical conductance of the acid phase of the sulfation reaction mixture is a convenient means for the establishment of the best combination of the residence time and temperature of the acid phase of the reacting mixture for the completion of the sulfation reaction. It is only necessary to determine the rate of change of electrical conductance with residence time at least two temperatures, and then by plotting the data in the relationship applicable to chemical reactions of the first order, the approach to completion of the sulfation reaction can be ascertained readily for any combination of temperature and residence time of the acid phase of the sulfation reaction mixture. While the determination of the electrical conductance of the acid phase is convenient in the establishment of these relationships of the temperature and residence time, the determination of other properties of the acid phase such as, for example, its specific gravity may be adequate for the purpose. Appropriate temperatures for the completion of the sulfation reaction are not lower than 175° F. and are preferably above 200° F. and, in any event, the appropriate maximum temperature will be such that the residence time of the acid phase will not be more than 30 minutes.

Since the sulfation reaction is first order, the reaction rate is not affected by the partial pressure of the reactant olefins provided, of course, that there is present in the reaction mixture, at least some of the reactant olefin, and preferably a detectable amount of the reactant olefin, on completion of the sulfation reaction. The foregoing conditions pertinent to the completion of the sulfation reaction are applicable only with provision for adequate contact between the reactant olefin and the acid phase of the reaction mixture. The required contact between the reactants may be obtained by heating the reacting mixture in a continuous pipe coil reactor or other means such as submersion of a heating coil in the acid phase of the reacting mixture maintained in the bottom of the separating vessel 9 as indicated in the accompanying diagrammatic illustration of the process of this invention. Since the alkyl sulfates are thermally stable at the temperatures appropriate for the completion of the sulfation reaction, prolonged residence times of the sulfation reaction mixture are objectionable only from the standpoint of the excessive construction and operating costs involved in the maintenance of the required intimacy of contact between the reactants in the sulfation reaction mixture.

In addition to serving as a means for heat recovery, the heat exchanger coil 8 shown in the top of the separating vessel 9 in the accompanying diagrammatic sketch will serve to prevent the loss of any of the di-alkyl sulfates which being covalent substances, are slightly vaporizable under some conditions which may prevail in some cases in the separation of the alkyl sulfates from the completely vaporizable non-reactive substances present in admixture with the olefin feed. It is important to note that no water will be lost with the vapors discharged from the separating vessel 9 provided, of course, that sulfation reaction is completed at a temperature appropriate to the complete utilization of the reactants in the sulfation reaction mixture for reasons which have been presented in the foregoing. On completion of the sulfation reaction the water, sulfuric acid and olefins will be consumed in the formation of alkyl sulfates in the ratios predicted by application of the formula of Equation 17.

On completion of the sulfation reaction a portion of the alkyl sulfates will be subjected to the hydrolysis reaction in accordance with the overall reaction of Equation 22. Since the mol ratio of the sulfuric acid to water in the hydrolysis acid is not substantially greater than 1.0 corresponding to 85% sulfuric acid by weight, the vapor pressures of which is well established, it is possible to complete the composition of the vapor leaving the hydrolysis vessel 42 for any temperature selected for the completion of the hydrolysis reaction. For example, at a temperature of 383° F. (195° C.) the vapor pressure of 85% sulfuric acid is 291 millimeters of mercury and the total pressure of the hydrolysis reactor will be 873 millimeters of mercury corresponding to a gauge pressure of 2.2 pounds per square inch for the production of one mol of normally gaseous product olefin accompanied by the recycling of one mol of recycled normally gaseous olefin for each mol of product olefin. Thus, in this example, the vapor pressure of the 85% sulfuric acid is one third of the total pressure. The total pressure of the hydrolysis reactor can be computed for any other selected ratio of recycled olefin to product olefin which ratio will be dependent on considerations of optimum heat recovery as discussed hereinafter. In the applications in which product olefin is liquefiable at the temperature and pressure selected for the hydrolysis reaction it is necessary to know the equilibrium vaporizatoin constant of the product olefin under these conditions. It is clear that the temperature of hydrolysis reaction should be as low as possible to the end that thereby the vaporization of water will be a minimum and reducing the heat requirements correspondingly. But as the temperature is reduced the residence time for completion of the hydrolysis reaction is increased correspondingly making it necessary to find an appropriate combination of time and temperature for the hydrolysis reaction.

The hydrolysis reaction is strictly first order dependent as it is on the activation of the di-alkyl sulfate in the liberation of a tertiary or pseudo tertiary hydrogen atom in the formation of the alkyl lyate ion and with the formation of a hydroxonium ion with the release of a mol of olefin in accordance with the reaction of Equation 18. Being a first order reaction, the selection of the best combination of temperature and residence time for the hydrolysis reaction can be made in a straightforward manner from the data obtained in the determination of the rate of change of the electrical conductance or any other conveniently determined physical property such as the specific gravity of the acid phase of the hydrolysis reacting mixture for at least two sufficiently different temperatures and using the data in the relationships applicable to chemical reactions of the first order. The rate of the hydrolysis reaction varies widely with different olefins being much faster in the case of branched olefins which yield alkyl sulfates having tertiary hydrogen atoms. In any event, the temperature of the hydrolysis reaction will be at least 200° F. and will be higher as may be required for completion of the hydrolysis reaction with a residence time of less than 30 minutes for the acid phase of the hydrolysis reaction mixture. The pressure at which the hydrolysis reaction is conducted will be above that of the atmosphere due to necessity for the cycling of a normally gaseous olefin from the hydrolysis reaction vessel to the dehydration stage for reasons to be delineated in more detail hereinafter. In any event, the desirable pressure can be computed using a vapor pressure of 85% wt. sulfuric acid as brought out by example in the foregoing. From such computations used in conjunction with data pertinent to the first order hydrolysis reaction as set forth in the foregoing, the best combination of pressure, temperature, the residence time of the acid phase of the hydrolysis reaction mixture and the gas recycle rate to the dehydration stage can be established readily. It is to be reemphasized that while the mol ratio of acid to water in the hydrolysis acid must be greater than 1.0, it is important that this ratio be not substantially greater than 1.0 to the end that the alkyl sulfate content of the hydrolysis acid will be reduced to a minimum. In those applications of the process of this invention in which the product olefins are liquefiable under the conditions of the hydrolysis reaction, it is important that the temperature of the hydrolysis reaction be not reduced during the separation of the product olefins from the hydrolysis acid following the hydrolysis reactions, since with a reduction in temperature there will be polymerization of the olefins and contamination and degradation of the hydrolysis acid. When the product olefins are completely vaporizable, and if the hydrolysis reaction is carried to substantial completion, there will remain in the hydrolysis acid only a negligible amount of alkyl sulfate in which case, the temperature of the hydrolysis acid as withdrawn from the hydrolysis reaction can be reduced as desired for mixing with the recycled alkyl sulfates without suffering extensive undesirable reactions. It will be understood that to the extent to which the hydrolysis reaction is incomplete the di-alkyl sulfates present in the hydrolysis acid following its separation will undergo polymerization on cooling the hydrolysis acid and that the polymer thus formed will be sulfated and thus accumulate in the system until hydrolyzed and separated as a high boiling polymer from the hydrolysis acid in separating vessel 67.

The detailed specifications of the dehydration stage of the process of this invention can be delineated to best advantage by consideration of the overall heat balance of the entire process. Since its heat requirements are only nominal in comparison with the processes known heretofore for the recovery of olefins, the justification for detailed consideration of the overall heat balance of the process of this invention resides largely in the utilization of the heat balance to focus attention particularly on the indispensability of the dehydration stage and the role therein of the chemical reactions of Equations 1–9 inc. and 23–24 inc. My delineation of all these reactions is vital to an adequate understanding of the dehydration stage in that all being exothermic, they contribute to the vaporization of water which is released in the dehydration stage and is vaporized at partial pressures equal to the vapor pressure of water. This follows from the fact that there is no sulfuric acid as such in the dehydration stage and, in consequence, the vapor pressure of water is not depressed. In addition to the heat made available in the dehydration stage by the exothermic reactions, there is also available for the vaporization of water, the heat recovered by heat exchange. Of first importance is the heat added to the sulfation reaction mixture by its heat exchange with the vapors from the hydrolysis stage in heat exchanger 6 shown in the accompanying diagrammatic sketch. It is to be noted that the maximum temperature in heat exchanger 6 will be less than 200° F. at which temperature the sulfation reaction mixture undergoes the endothermic ionization which is the result of the reaction of di-alkyl sulfate with water in the reaction of Equation 18. The completeness with which the heat available from the effluent vapor from the hydrolysis reaction is recovered depends on the recycle rate of the di-alkyl sulfates which can be made as high as may be required for the recovery of heat to the extent desired. From the heat exchanger 6, the sulfation reaction mixture flows through line 7 into heat exchanger 8 in which heat is recovered from the vapors evolved in the sulfation reaction. The recovery of heat in exchangers 6 and 8 is made possible by the fact that the sulfation reaction is complete only at temperatures above 200° F. while the recovered heat is available at temperatures less than 200° F. Thus in addition to the heat recovered by heat exchange, all of the heat evolved in the formation of the di-alkyl sulfate is available for the vaporization of water in the dehydration stage. Provision is also made for the recovery of heat from the hydrolysis acid stream by its passage through the exchanger coil 97 placed in the heating vessel 85. In addition to the heat recovered by heat exchange, additional heat can be supplied to the dehydration stage by the circulation of an appropriate heating medium through the heating coil 86 placed in heating vessel 85. In fact, as already stated in the foregoing all of the heat requirements of the dehydration stage can be supplied without any heat exchange, or any amount of heat exchange which may be justified economically without impairment of the fundamental operability of the process of this invention. In any case the heat supplied to the dehydration stage will be done in such manner that the vaporization of the water will be completed by the counter-current contacting of the di-alkyl sulfates with the recycled gaseous olefin to the end that heat will be completely recovered from the di-alkyl sulfates at a temperature reduced to that at which the stream of di-alkyl sulfate can be mixed with the hydrolysis acid with either none, or only a minimum of dissipation of heat to cooling water. It will be understood that the rate of gaseous olefin recycle to the dehydration stage can be adjusted as required for the complete vaporization of the water at any selected maximum temperature in the dehydration stage which advantageously will be lower than 200° F. In the selection of the maximum temperature and gas recycle rate to the dehydrogenation stage consideration must be given to the combination at which the temperature at the bottom of stripping tower will be such that solution of the gas recycle in the di-alkyl sulfate stream will not be excessive. Otherwise gas recycle will be carried into the sulfation reaction mixture thus reducing the recovery of olefin from sulfation reaction mixture. With the selection of the appropriate temperature in the dehydration stage and the corresponding gas recycle rate, the vaporization of water from the di-alkyl sulfate can be made substantially complete with any amount of heat exchange as may be justified for any particular application of the process of this invention. From the ordinary demands of chemical equilibrium, it follows that as the ratio of recycled di-alkyl sulfates to the hydrolysis acid is increased above that corresponding to a mol ratio of 1.0, the endothermic reaction of di-alkyl sulfate with water in accordance with Equation 18 is correspondingly increased with the result that heat recovery from the vapors from the hydrolysis reactor is increased. This heat exchange is limited to a maximum of approximately 200° F. since the heat recovery is largely from the condensation of the water vapor from the hydrolysis reactor. But this increase in the ratio of the di-alkyl sulfate to the hydrolysis acid which increases heat recovery demands an increase in the sulfation reaction temperature and residence time of the sulfation reaction mixture for any selected approach to the completion of the sulfation reaction. Of course, the additional heat which must be added to the sulfation reaction mixture with higher di-alkyl recycle rates will be recovered in the dehydration stage thus reducing the amount of heat which must be added therein from an outside source through heating coil 86 in heating vessel 85. But since the maximum temperature of the dehydration stage is less than that of the sulfation stage, and since abortion of the heat added in the sulfation stage is lost in the effluent vapors therefrom, it follows that there is some advantage in some applications of this invention for adding heat in the dehydration stage rather than in the sulfation stage. Likewise and for similar reasons it is advantageous to provide for the addition of heat in the dehydration stage with a corresponding reduction of the heat added in the hydrolysis stage due to the much higher temperature of the latter. The complete heat balance will show that the heat which must be added in the hydrolysis stage can be supplied largely by the condensation of the water therein vaporized at the lower temperature of the dehydration stage, even in the case in which large amounts of water must be vaporized when weak acid is charged to the hydrolysis stage. This relationship of the dehydration stage to the hydrolysis stage in the overall heat balance serves to emphasize the fact that the ratio of the combined recycle streams of di-alkyl sulfate and hydrolysis acid to the reactant olefins must be increased when it is required that large amounts of water must be removed in the overall process as in the case when highly dilute acid is charged in the process. The increased heat requirements imposed by the utilization of dilute acid can be supplied by increasing the heat supplied directly to the hydrolysis reactor 42 through the heating coil 47 submerged in the acid phase of the hydrolysis reactor. Also a portion of the gas recycle can be introduced directly into the hydrolysis reactor through lines 40, 105, 75 and 73. Even though the heat supplied to the hydrolysis reactor is recoverable by heat exchange, this may well be unimportant in some applications of the process of this invention, since in event, its energy requirement is not a major factor in any of its applications.

Even with recourse to any of the various alternatives of the process of this invention which may be desirable or preferred from the standpoint of heat balance as delineated in the foregoing, there is no impairment in any case of the selectivity of the reactions in the recovery of olefins according to type or molecular weight. For example, with the maximum ratio of the combined recycle stream to the reacted olefin as in the case when dilute acid is charged, the selectivity as desired can be maintained by adjusting the temperature at which the sulfation reaction is completed to that at which only the desired olefins are reacted. In the foregoing it was shown that the selectivity in the sulfation reaction is due to the reactivity of the tertiary and pseudo tertiary hydrogen atoms of the alkyl lyate ions and in both instances the selectivity is further dependent on the molecular weight of the reactant olefin. The mechanism of selectivity in the sulfation reaction can be further visualized by recalling the liberation of the olefin in the ionization of the di-alkyl sulfate in its reaction water as in Equation 18 and the further reaction of this olefin thus liberated in the formation of di-alkyl sulfate as, for example, in the reactions of Equations 6, 9 and 23. From this mechanism it can be concluded that the selectivity in the sulfation reaction can be facilitated by the completion of the sulfation reaction at a minimum temperature in combination with the requisite residence time of the sulfation reaction mixture. Even at the minimum temperature required for the desired selectivity in the sulfation reaction heat recovery is not impaired, because the temperature at which the sulfation reaction is completed is always much higher than the temperature at which water is vaporized in the dehydration stage. Thus in any case, heat will be transferred from the sulfation stage to the dehydration stage and the amount of heat added in the sulfation stage is reduced to any appropriate amount by the heat recovered by heat exchange between the sulfation reaction mixture and the effluent vapors from the sulfation stage and from the effluent vapors and hydrolysis acid from the hydrolysis stage.

With recourse to the techniques for the selective reaction of olefins for which provision has been made as delineated in the foregoing, all of the branched chain olefins can be recovered completely as a group from their mixtures in other olefins and other hydrocarbons, following which the straight chain olefins other than ethylene can be recovered as a group from the residual mixture after the extraction of the branched chain olefins. The product olefins can be separated by conventional fractional distillation for the recovery of the individual olefins. With the processes available heretofore, the recovery of individual olefins from their complex mixtures has been impossible. With the substantially complete recovery of heat as delineated in the foregoing, the individual olefins can be recovered advantageously directly in some applications of the process of this invention, thus making unnecessary recourse to fractional distillation of mixtures containing the desired individual olefin. In the selective recovery of olefins there is isomerization of the unreacted straight chain olefins as evidenced by the migration of the double bond. For example, in the selective extraction of isobutylene there is substantially complete conversion of butylene-1 into butylene-2. The tendency of the double bond to migrate to the middle of the molecule is even more pronounced in the case of olefins of higher molecular weight than the butylenes. The delineation of this type of olefin isomerization in the process of this invention has been another asset in the establishment of its chemical mechanism as expressed in the equations in the foregoing as well as in the confirmation of the concepts of the mechanism of the switching of electrons and hydrogen atoms in the formation and destruction of ionic reaction intermediates in accordance with the extension of the exclusion principle and in refutation of the proton theory of acids.

In the presentation of all of the foregoing there may be the implication that the term "olefin" is limited to monoalkenes, that is, the mono-olefins which have only one double bond per molecule. However, this terminology need not be so restricted, because the process of this invention will be used also for the recovery of di-olefins such as butadiene which have two double bonds per molecule. It has been long known that aqueous sulfuric acid is more reactive to isobutylene than it is to butadiene which in turn is more reactive than the straight chain butylenes. With recourse to the techniques of the process of this invention, and above all with recourse to its chemical mechanism which has been delineated, it is established that these differences in reactivities can be taken advantage of in the selective extraction of di-olefins in their admixture with branched chain and straight chain mono-olefins. For example, in the recovery of the individual olefins from mixtures containing only the butylenes and lighter olefins, it is only necessary to subject the mixtures to the conditions such that only the isobutylene is reacted and then subject the residual mixture therefrom to conditions appropriate to the extraction of the butadiene followed by the removal of the straight chain mono-olefins. The selection of conditions for the selective extraction of the individual olefins involves primarily the adjustment of the olefin feed rate to the rate of the combined recycle rates of the di-alkyl sulfate and hydrolysis acid for the desired approach to completion of the sulfation reaction in accordance with the formula of Equation 17. It is true that selectivity of the sulfation reaction in the recovery of individual olefins is improved by an increase in the ratio of di-alkyl sulfate to hydrolysis acid in the combined recycle stream as well as by lower temperatures and longer residence times of the sulfation reacting mixture, but all of these secondary conditions found to be appropriate for the recovery of all olefins other than ethylene as a group will also be appropriate for the recovery of individual olefins. For example, the ratio of di-alkyl sulfates to hydrolysis acid will be selected on the basis of an approach to complete heat recovery dictated by the economies of the installation and operation of the additional equipment required for more complete heat recovery. Likewise, the residence time of the sulfation reaction mixture will be selected such that the maximum temperature of the sulfation reaction mixture will be such that it can be maintained with the appropriate heating medium which in turn is determined by the economies involved in supplying the heat requirements. Thus the only factor of major consequence involved in the selection of conditions appropriate to the recovery of the individual mono-olefins and di-olefins is the selection of the ratio of the feed olefin stream to the hydrolysis acid. Likewise, the conditions in the hydrolysis and dehydration stages of the process of this invention will be substantially the same whether the process of this invention is used for the recovery of all the olefins other than ethylene as a group, or whether it is used for the selective recovery of olefins by groups or as individual olefins within a group.

Reference has been made already in the foregoing to the utilization in the process of this invention of the dilute sulfuric acid such as that produced in the manufacture of alcohols and the concentrated acid such as the spent acid which is a product of the sulfuric acid alkylation process. In the utilization of the dilute sulfuric acid the only conditions requiring adjustment are those involved in the heat balance as already delineated in the foregoing. In the utilization of the spent alkylation acid a further consideration of the hydrolysis reaction is of interest in view of the particular requirements for the complete hydrolysis of the high molecular weight monoalkyl sulfates which comprise the previously unidentified carbonaceous matter of these acids. In the presentation of the overall hydrolysis reaction of Equation 22 in the foregoing, it was brought out that the self-ionization of alkyl hydrogen sulfate is involved in the completion of the hydrolysis reaction even though it can be initiated by the direct ionization of the di-alkyl sulfate with water in accordance with Equation 18. This mechanism of the hydrolysis reaction is substantiated by the well-known fact that spent alkylation acids can not be recovered by their addition to water as is done in the recovery of certain other spent acids (sludges) which are the products of various petroleum refinery processes. Actually the inability to recover spent alkylation acid by the hydrolysis techniques known heretofore is completely consistent with the fact that no processes have been made available heretofore for the recovery of olefins by the hydrolysis of alkyl sulfates. With these facts in view, provision has been made in the process of this invention for the self-ionization of the alkyl hydrogen sulfates of any molecular weight in accordance with the reaction of Equations 12 and 13 and for the conversion of the resultant alkyl lyate ions by their reaction with water in the formation of the doubly ionized sulfate ion with the release of olefins in accordance with the reaction of Equation 14. And finally there is the formation of the bisulfate ions in accordance with Equation 20 as a step in the overall hydrolysis reaction of Equation 22. From the complete delineation of the chemical mechanism and the inner mechanism as well of the process of this invention, it follows that spent alkylation acid can be recovered only by its admixture with di-alkyl sulfates for hydrolysis in accordance with the specifications of the process of this invention. The reactivity of the olefins resulting from the hydrolysis of the spent alkylation acid emphasizes the importance of the separation of these substantially non-volatile olefins from the product hydrolysis acid at temperatures at least as high as the temperature at which the hydrolysis reaction is completed for which provision has been made in the separator 67 as included in the accompanying diagrammatic illustration of this invention to which reference has been made in its foregoing description. When there is compliance with this specification the carbonaceous matter present in the hydrolysis acid product will be so reduced that it will meet the ordinary commercial requirements specified for 85% sulfuric acid. It is with this assurance that provision has been made in the process of this invention for the withdrawal of hydrolysis acid from line 98 through line 107 and for its discharge by means of pump 108 through line 109 as already stated. While the importance of completing the hydrolysis reaction can be readily seen for obvious reasons in those applications of the process of this invention in which some of the hydrolysis acid is withdrawn as a final product, this substantial completion of the hydrolysis reaction is a matter of great importance in all applications. For example, if either alkyl sulfates or polymers or both are withdrawn with the hydrolysis acid, there is both re-absorption of the polymers and polymerization of the alkyl sulfates when the temperature of the hydrolysis acid is reduced as required for its mixing with the di-alkyl sulfates which must precede the preparation of the sulfation reaction mixture. To the extent to which these polymers are not removed they accumulate in the system and increase correspondingly the amount of hydrolysis acid required for the recovery of a given amount of olefin. The polymers formed on cooling the hydrolysis acid with di-alkyl sulfate are the high molecular weight alkyl hydrogen sulfates such as those present in spent alkylation acid. The requirements for the completion of the hydrolysis reaction are no less exacting in those applications of the process of this invention in which alkyl sulfates are withdrawn in amounts corresponding to the amount of acid introduced and for their utilization in processes such as in the sulfuric acid alkylation process and in the manufacture of alcohols. In such applications the high molecular weight alkyl hydrogen sulfates are inert in these processes and therefore accumulate just as they do in the spent acid from the sulfuric acid alkylation process. In any event, and in any application, the polymers and alkyl sulfate content of the hydrolysis acid can be reduced to substantially zero by adherence to the specification of the process of this invention which includes provision for operation of the hydrolysis reactor at the temperature at which the electrical conductance of the acid phase of the hydrolysis reaction is a maximum when its mol ratio of sulfuric acid to water is maintained as closely as possible to 1.0, but in no case less than 1.0. These specifications are in no way altered and become no less imperative when sulfuric acid itself is added directly in the process of this invention for its reaction in the production of alkyl sulfates as for example, the cylic use of a stream of sulfuric acid in the so-called two-stage sulfuric acid alkylation process which has failed heretofore due primarily to the unavailability of a process for the production of alkyl sulfates which has been perfected in the process of this invention. An even more appropriate application of this direct addition of sulfuric acid in the process of this invention is in its application in conjunction with the process entitled "Alkylation of Isoparaffins with Alkyl Sulfates" for which patent application Serial Number 685,693 was filed September 23, 1957. The advantage for the combination of the process of this invention with the alkylation processes is the fact that the acid in the alkylation process is regenerated continuously and not allowed to become degraded to a minimum level of activity at which the alkylation reaction is less efficient as has been necessary prior to this invention. This continuous regeneration is, of course, accomplished in the hydrolysis reaction of the process of this invention as delineated in the foregoing.

From their usual sources from which olefins are available in their dilute concentrations for utilization in the process of this invention, the feed olefins will be in admixture with no substances which can be regarded as an impurity to the extent that the removal of such substances is necessary prior to charging as feed to this process. The water always present as a liquid or vapor in the feed will be removed by its vaporization from the hydrolysis reactor. Hydrogen sulfide or other sulfur compounds will not interfere since under the conditions specified for completion of the sulfation reaction sulfur compounds are not reactive and are therefore freed from the alkyl sulfates by their vaporization along with other substances non-reactive in the sulfation reacting mixture.

It will be understood that in order to initiate the operation of the process of this invention provision must be made for a source of di-alkyl sulfates from which can be charged the various vessels, lines, and other equipment essential for operation as set forth in the foregoing. The first step in the preparation of this initial charge of alkyl sulfates is the chilling to a temperature of at least 30° F. and preferably below 20° F. of a convenient minor quantity of aqueous sulfuric acid in which the mol ratio of sulfuric acid to water is greater than 1.5 corresponding to more than 89.0% sulfuric acid by weight. To this chilled sulfuric acid a normally gaseous olefin, preferably propylene, is added until reaction is completed in the formation of propyl sulfates which will be the case when 1.3 mols of propylene per mol of sulfuric acid have reacted. During the preparation of this minor quantity of the propyl sulfates, the reaction temperature should be below that of the atmosphere. On completion of the reaction in the formation of the propyl sulfates, the pressure is reduced to that of the atmosphere and the temperature to that of the room. To this minor quantity of propyl sulfates, sulfuric acid having a minimum concentration of 89% by weight is added in amount so limited that on completion of the slow addition of the acid with good mixing, the mol ratio of the olefin to the acid is not less than 1.0. On completion of the addition of the acid, propylene is added to the lean propyl sulfates at room temperatures or above until the reaction in the formation of propyl sulfates is complete, whereupon the excess propylene is removed and acid again added slowly with good mixing at room temperature, or even higher as convenient, until the reaction in the formation of propyl sulfates is again complete. With this continued alternate addition of olefins and acid, any amount of di-alkyl sulfates can be prepared as may be required for the initiation of any application of the process of this invention starting with any minor amount of refrigerated acid as may be appropriate for the preparation of the necessary initial quantity of the di-alkyl sulfate.

From its foregoing description it is established that the process of this invention is highly versatile in that it can be used for the recovery of selected reactant olefins either as such in high purity or in the form of their alkyl sulfates suitable for their utilization in various uses including the sulfuric acid alkylation process and in the manufacture of alcohols. The inclusion of these various applications has facilitated the demonstration of the validity of the chemical mechanism which has served in the development and establishment of the process of this invention for which claims can be made as follows.

What is claimed is:

1. A process for the recovery of olefins other than ethylene in relatively high purity from a mixture containing olefins, other hydrocarbons and other substances by reacting the mixture with a recycled stream of aqueous sulfuric acid containing at least 85% sulfuric acid by weight liberated in a hydrolysis stage of the process in which hydrolysis stage a recycle stream of hydrolysis acid is combined with a recycle stream of di-alkyl sulfates obtained from a dehydration stage of the process, and in which hydrolysis stage the proportion of the two recycled streams is such that for each mol of water in the combined recycle stream there are not less than 1.5 mols of sulfuric acid per mol of water counting as such the sulfuric acid in the hydrolysis stream and the acid consumed in the formation of the di-alkyl sulfates, and proportioning the combined recycle stream to the reactant olefin in the olefin feed stream in the preparation of the sulfation reaction mixture of the process so that on completion of the sulfation reaction in the formation of the alkyl sulfates at a temperature not less than 175° F. in the sulfation stage, there remains no more than a detectable amount of the olefins selected for reaction in the hydrocarbons and other non-reactive substances which are completely vaporized and separated in the sulfation stage from the alkyl sulfates of which a portion is directed into a dehydration stage of the process in which the alkyl sulfates are contacted counter-currently with a recycle stream of normally gaseous olefins from the hydrolysis stage, proportioning the stream of alkyl sulfates and gaseous olefins so that the reaction is substantially complete in the formation of di-alkyl sulfates, and maintaining the temperature in the dehydration stage so that simultaneously substantially all the water contained in the alkyl sulfate stream is vaporized therefrom in admixture with the unreacted portion of recycled olefin stream and this admixture then directed into the hydrolysis reactor along with a portion of the alkyl sulfates from the sulfation stage and with the further addition of water to the hydrolysis reactor as required for the substantial completion of the hydrolysis reaction in the destruction of the alkyl sulfates with the addition of heat as required to maintain the hydrolysis reactor at a temperature above 200° F. with a residence time of not more than 30 minutes of the acid phase of reaction mixture undergoing hydrolysis with the formation of aqueous sulfuric acid containing not less than 1.0 mol of sulfuric acid for each mol of water corresponding to 85% sulfuric acid by weight and with the evolution of vapors in the hydrolysis reactor consisting in part of the recycled gaseous olefin so proportioned to the other reactants in the hydrolysis reaction that the specified concentration of the hydrolysis acid is maintained at the temperature selected for the hydrolysis reaction with another part of the vapors from the hydrolysis reactor being water vapor at a partial pressure equal to the vapor pressure of the hydrolysis acid at the selected temperature and with the remaining part of the vapor being the product olefins with the total pressure of the hydrolysis resultants being greater than that of the atmosphere with the subsequent cooling and condensation of the total vapors with the recovery of the product olefins and with the delivery of the normally gaseous recycle olefins to the dehydration stage in which the recycle olefins are so proportioned that there is substantially no retention of the recycled olefins in solution in the product di-alkyl sulfates which are recycled from the dehydration stage for admixture with the recycled stream of hydrolysis acid after its separation from olefins not vaporized in the hydrolysis reactor with both streams being so reduced in temperature if required for the avoidance of polymerization during the effective mixing of the two recycle streams as evidenced by no temperature rise in the preparation of the combined recycle stream of di-alkyl sulfates and hydrolysis acid.

2. The process of claim 1 in which the recycle stream of di-alkyl sulfates is proportioned to the recycled hydrolysis acid so that in the combined recycle stream there is at least one mol of olefin per mol of acid and also at least one mol of olefin per mol water in the combined recycle stream.

3. The process of claim 1 in which a portion of the recycled stream of normally gaseous olefins obtained following the condensation of the vapors from hydrolysis stage is returned to the hydrolysis reactor without its passage through the dehydration stage.

4. The process of claim 1 in which the temperature of the hydrolysis reactor is maintained at a temperature above 300° F.

5. The process of claim 1 in which the temperature and residence time of the acid phase of the hydrolysis reactor are correlated in the relationships applicable to chemical reactions of the first order.

6. The process of claim 1, in which dilute sulfuric acid such as that produced in the manufacture of alcohols using the sulfuric acid process or the concentrated sulfuric acid such as the spent acid from the sulfuric alkylation process is added to the hydrolysis reactor while withdrawing alkyl sulfates following the completion of the sulfation reaction in the sulfation stage in amounts corresponding to amount of acid added to the hydrolysis reactor.

7. The process of claim 1 in which dilute sulfuric acid such as that produced in the manufacture of alcohols using the sulfuric acid process or concentrated sulfuric acid such as the spent acid from the sulfuric acid alkylation process is added to the hydrolysis acid while withdrawing the substantially anhydrous di-alkyl sulfates from the dehydration stage in amounts corresponding to the amount of acid added to the hydrolysis reactor.

8. The process of claim 1 in which the feed olefins contain only isobutylene and other olefins having four or less carbon atoms per mol and in which the combined recycle streams of di-alkyl sulfate and hydrolysis acid is so proportioned to the feed olefin stream that on completion of the sulfation reaction there is at least a detectable amount of isobutylene in the hydrocarbons discharged from the sulfation stage with recovery of the isobutylene as product olefin or as a mixture of isobutyl sulfates or as di-isobutyl sulfates.

9. The process of claim 1 in which the feed olefins contain only isobutylene and butadiene and other olefins having four or less carbon atoms per mol and in which the ratio of the combined recycle streams of di-alkyl sulfate and hydrolysis acid is so proportioned to the feed olefin stream that on completion of the sulfation reaction there remains in the hydrocarbons discharged from the sulfation stage only a detectable amount of butadiene in the hydrocarbon vapors discharged from the sulfation stage with the substantially complete recovery of the butadiene and isobutylene either as product olefins or in the form of a mixture of their mono- and di-alkyl sulfates or as their substantially anhydrous di-alkyl sulfates.

10. The process of claim 1 in which in the feed olefin stream isobutylene is substantially absent and which contains only butadiene and other olefins having four or less carbon atoms per mol and in which the combined recycle stream of di-alkyl sulfates and hydrolysis acid is so proportioned to the feed olefin stream that on completion of the sulfation reaction there remains in the hydrocarbons discharged from the sulfation stage only a detectable amount of the butadiene with recovery of the butadiene either as the product olefin, or in the form of its mono- and di-alkene sulfate or in the form of its substantially anhydrous di-alkene sulfate.

11. The process of claim 1 in which the feed olefin stream contains branched and straight chain olefins and in which the combined recycle stream of di-alkyl sulfates and hydrolysis acid is so proportioned to the feed olefins that on completion of the sulfation reaction there remains only a selected amount of the branched chain olefins in the hydrocarbons discharged from sulfation stage and the branched chain hydrocarbons are recovered as the product olefins or as their di-alkyl sulfates from the dehydration stage of the process or as alkyl sulfates from the discharge from the sulfation stage.

12. The process of claim 1 in which the feed olefins contain branched chain olefins and in which the combined recycle stream of recycled di-alkyl sulfates and recycled hydrolysis acid is so proportioned to the feed olefins that on completion of the sulfation reaction there will be present in the hydrocarbons discharged from the sulfation stage no more than a selected amount of the branched chain olefins having a molecular weight equal to the molecular weight of the branched chain olefins selected for extraction and recovering the branched chain olefins either as such as product olefins or as their substantially anhydrous sulfates from the dehydration stage or directly as alkyl sulfates from the discharge from the sulfation stage.

13. The process of claim 1 in which the feed olefins contain only straight chain olefins and in which the combined recycle stream of di-alkyl sulfates and hydrolysis acid is so proportioned to the feed olefins that on completion of the sulfation reaction there will be present in hydrocarbons discharged from the sulfation stage only a selected amount of olefins having the molecular weight selected for reaction and recovering the olefins of the selected molecular weight either as such as product olefins or as their di-alkyl sulfates from the dehydration stage or as the alkyl sulfates discharged from the sulfation stage.

14. The process of claim 1 in which heat is recovered by the passage of sulfation reaction mixture in heat exchange relationship with either the vapors from the hydrolysis stage or with the vapors from the sulfation stage or by heat exchange with both the hydrolysis vapors and the vapors from the sulfation stage either in series or parallel.

References Cited in the file of this patent

UNITED STATES PATENTS

| | | |
|---|---|---|
| 2,424,186 | Packie et al. | July 15, 1947 |
| 2,456,260 | Draeger | Dec. 14, 1948 |
| 2,581,065 | Arnold | Jan. 1, 1952 |
| 2,756,266 | Francis | July 24, 1956 |